(12) United States Patent
Venkatrao et al.

(10) Patent No.: US 10,678,806 B2
(45) Date of Patent: *Jun. 9, 2020

(54) PER-USER AGGREGATION OF DATABASE CONTENT

(71) Applicant: Microsoft Technology Licensing, LLC, Redmond, WA (US)

(72) Inventors: Murali Venkatrao, Redmond, WA (US); Ji Tang, Redmond, WA (US); R P Huang, Redmond, WA (US); Mohammed Nazeeruddin, Redmond, WA (US); Ignacio Omar Venado Estrada, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 628 days.

This patent is subject to a terminal disclaimer.

(21) Appl. No.: 14/687,578

(22) Filed: Apr. 15, 2015

(65) Prior Publication Data
US 2015/0220536 A1    Aug. 6, 2015

Related U.S. Application Data

(63) Continuation of application No. 13/728,558, filed on Dec. 27, 2012, now Pat. No. 9,031,918.

(51) Int. Cl.
G06F 16/25    (2019.01)
G06F 16/958    (2019.01)
G06F 16/23    (2019.01)

(52) U.S. Cl.
CPC ........ G06F 16/252 (2019.01); G06F 16/2365 (2019.01); G06F 16/972 (2019.01)

(58) Field of Classification Search
CPC .......... G06F 17/5056; G06F 17/30371; G06F 17/30893; G06F 16/2365; G06F 16/252; G06F 16/972

(Continued)

(56) References Cited

U.S. PATENT DOCUMENTS 6,564,251 B2    5/2003    Katariya et al.
9,031,918 B2    5/2015    Venkatrao et al.
(Continued)

FOREIGN PATENT DOCUMENTS

CN    101114302 A    1/2008
CN    101788991 A    7/2010
(Continued)

OTHER PUBLICATIONS

Browser-Side Cache—Ajax Patterns, Published on Dec. 20, 2012, Available at: http://wayback.archive.org/web/20121220071014/http://ajaxpatterns.org/Browser-Side_Cache, 6 pgs.

(Continued)

*Primary Examiner* — James Trujillo
*Assistant Examiner* — Fariborz Khoshnoodi

(57) ABSTRACT

A method for providing per-user aggregation of content accessible via a personalized user site may generally include receiving a request for metadata and determining whether the requested metadata is expired. The method may further include returning at least a portion of queried metadata prior to verifying whether the metadata is expired. The method may then include querying a change log for metadata modifications. The method may further include, if metadata has been modified since a previous query, sending a query to a community site for metadata that meets change criteria. The method may also include receiving the changed metadata and returning the changed metadata to a content group container within the personalized user site.

20 Claims, 6 Drawing Sheets

(58) Field of Classification Search
USPC .................................................. 707/687, 689
See application file for complete search history.

(56) References Cited

U.S. PATENT DOCUMENTS

| | | | |
|---|---|---|---|
| 2002/0046075 A1* | 4/2002 | Gangopadhyay | G06Q 10/06 705/7.14 |
| 2002/0065835 A1 | 5/2002 | Fujisaki | |
| 2004/0044752 A1* | 3/2004 | Hamaguchi | G01C 21/32 709/220 |
| 2004/0059805 A1* | 3/2004 | Dinker | G06F 11/2069 709/223 |
| 2004/0215568 A1* | 10/2004 | Fukushima | G06Q 30/02 705/51 |
| 2007/0203890 A1 | 8/2007 | Sareen et al. | |
| 2008/0040672 A1* | 2/2008 | Appleyard | G06F 16/954 715/742 |
| 2008/0127133 A1 | 5/2008 | Aghara et al. | |
| 2008/0215675 A1 | 9/2008 | Kaminitz et al. | |
| 2009/0307302 A1* | 12/2009 | Tennant | G06F 17/30132 709/203 |
| 2010/0235376 A1* | 9/2010 | Sukanen | G06F 16/68 707/769 |
| 2012/0331016 A1 | 12/2012 | Janson et al. | |
| 2015/0052615 A1* | 2/2015 | Gault | G06F 21/60 726/26 |

FOREIGN PATENT DOCUMENTS

| | | |
|---|---|---|
| CN | 102012907 A | 4/2011 |
| CN | 102789475 A | 11/2012 |

OTHER PUBLICATIONS

"Change Tracking Overview", Published on: Aug. 16, 2009, Available at: http://wayback.archive.org/web/20090816180422/http://technet.microsoft.com/en-us/library/bb933875.aspx, 2 pgs.

Chapter 6: Chant Data Management and Caching, Published on: Oct. 23, 2012, Available at: http://wayback.archive.org/web/20121023104716/http://msdn.microsoft.com/en-us/library/hh404101.aspx, 8 pgs.

"Portal Integration", Retrieved on: Apr. 4, 2012, Available at: http://msdn.microsoft.com/en-us/library/ff647030.aspx, 6 pages.

"SharePoint Enterprise Aggregation Caching Feature", Retrieved on: Apr. 4, 2012, Available at: http://www.kwizcom.com/objects/EnterpriseAggCacheFeature/v1.1/SharePoint%20Enterprise%20Aggregation%20Caching%20feature%20user%20guide.pdf, 35 pages.

"Techniques for Aggregating List and Site Information", Retrieved on: Apr. 4, 2012, Available at: http://msdn.microsoft.com/en-us/library/ff649417.aspx, 3 pages.

"PCT International Search Report & Written Opinion for PCT Patent Applicatuion No. PCT/US2013/077792", dated Apr. 25, 2014, Filed Date: Dec. 26, 2013, 12 Pages.

Ball et al., "Data Aggregation System—A System for Information Retrieval on Demand over Relational and Non-Relational Distributed Data Sources", Retrieved on: Apr. 4, 2012, Available at: http://iopscience.iop.org/1742-6596/331/4/042029/pdf/1742-6596_331_4_042029.pdf, 7 pages.

Bouzeghoub, et al., "A Framework for Analysis of Data Freshness", In Proceedings of the International Workshop on Information Quality in Information Systems, Jun. 18, 2004, pp. 59-67.

Campbell, "How Does Facebook Work? The Nuts and Bolts [Technology Explained]", Published on: Feb. 27, 2010, Available at: http://www.makeuseof.com/tag/facebook-work-nuts-bolts-technology-explained/, 9 pages.

PCT Written Opinion in International Application PCT/US2013/077792, dated Nov. 20, 2014, 7 pgs.

U.S. Appl. No. 13/728,558, Amendment and Response filed Nov. 25, 2014, 9 pgs.

U.S. Appl. No. 13/728,558, Notice of Allowance dated Jan. 7, 2015, 8 pgs.

U.S. Appl. No. 13/728,558, Office Action dated Aug. 27, 2014, 8 pgs.

"First Office Action and Search Report Issued in Chinese Patent Application No. 201380068440.4", dated Jun. 15, 2017, 16 Pages.

PCT International Preliminary Report on Patentability in International Application PCT/US2013/077792, dated Mar. 13, 2015, 8 pgs.

"Second Office Action Issued in Chinese Patent Application No. 201380068440.4", dated Jan. 12, 2018, 5 Pages.

"Office Action Issued in European Patent Application No. 13826824.8", dated Jan. 22, 2018, 7 Pages.

"Summons to Attend Oral Proceedings Issued in European Patent Application No. 13826824.8", dated Sep. 17, 2019, 7 Pages.

"Summon to Attend Oral Proceedings Issued in European Patent Application No. 13826824.8", dated Oct. 23, 2019, 2 Pages.

* cited by examiner

PER-USER AGGREGATION OF DATABASE CONTENT

CROSS-REFERENCE TO RELATED APPLICATIONS

This application is a Continuation of Non-Provisional application Ser. No. 13/728,558 filed Dec. 27, 2012, entitled "PER-USER AGGREGATION OF DATABASE CONTENT," which application is incorporated herein by reference in its entirety.

BACKGROUND

Databases are software systems that support the storage of data as collections of logical constructs called tables, each of the tables containing records with a specified structure. Database content may sometimes be partitioned among multiple URL-addressable locations. When data is partitioned among such multiple locations, where each of the location may contain different data, it may become cumbersome for a user to navigate to each location. Accordingly, retrieving requested information may result in increased data return rates.

SUMMARY

This summary is provided to introduce a selection of concepts in a simplified form that are further described below in the Detailed Description section. This summary is not intended to identify key features or essential features of the disclosure subject matter, nor is it intended to be used as an aid in determining the scope of the disclosure.

Embodiments are provided to create and manage content on a personalized user site. Methods and systems providing per-user aggregation of content are disclosed. Within the context of per-user aggregation, a per-user cache may be implemented to enable the user to traverse a URL to view and interact with personalized user site content. A user-specific URL which serves as a link to a personalized user site may be provided. From the site, information residing in one or more content groups may be retrieved from an aggregated list of content and stored in a corresponding content group container residing on the personalized user site. Content may be retrieved by the aggregated list from a plurality of different sources and locally cached at the personalized user site in the aggregated list.

In the embodiments described herein, personalized user site content may be updated utilizing an asynchronous update function which provides asynchronous updates for metadata of content stored in individual content group containers on the personalized user site. The asynchronous update function enables the personalized user site to update changed data within a content group displayed in the site independently of unchanged data. Application programming interfaces (APIs) may be provided in the personalized user site which, when exposed, facilitate the building and updating of customized data by providing asynchronous update behavior for data viewable via the personalized user site.

An embodiment includes a method for providing per-user aggregation of content accessible via a personalized user site. The method may generally include receiving a request for metadata and determining whether the requested metadata is expired. The method may further include returning at least a portion of queried data prior to verifying whether the metadata is expired. The method may then include querying a change log for metadata modifications. The method may further include, if metadata has been modified since a previous query, sending a query to a community site for data that meets change criteria. The method may also include receiving the changed metadata and returning the changed data to a content group container within the personalized user site.

A computer-readable medium comprising executable instructions that, when executed by a processor, provide per-user aggregation of content accessible via a personalized user site is also disclosed. The computer-readable medium includes instructions executable by the processor for: receiving a request for data; determining whether the requested data is expired; returning at least a portion of queried data prior to verifying whether the data is expired; query a change log for data modifications; if data has been modified since a previous query, sending a query to a community site for data that meets change criteria; receiving the changed data; and returning the changed data to a content group container within the personalized user site.

A computer-readable medium comprising executable instructions that, when executed by a processor, provide per-user aggregation of content accessible via a personalized user site is also disclosed. The computer-readable medium includes instructions executable by the processor for: receiving a request for metadata relating to at least one content group accessible via a personalized user site; determining whether the requested metadata is expired by comparing metadata residing in an aggregated list to a pre-determined staleness interval; returning at least a portion of queried metadata prior to verifying whether the metadata is expired; querying a change log for metadata modifications; if metadata has been modified since a previous query, sending a query to a community site for metadata that meets change criteria; receiving the changed metadata; and returning the changed metadata to a content group container within the personalized user site.

BRIEF DESCRIPTION OF THE DRAWINGS

Referring now to the drawings in which like reference numbers represent corresponding parts throughout.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Embodiments are provided to create and manage metadata for updating data on a personalized user site. Methods and systems providing per-user aggregation of content are disclosed. In response to client input, a personalized user site may query a content platform for lists of objects and metadata that match a given criterion. According to embodiments of the disclosure, a client query for metadata may execute a retrieval of the requested information without utilizing a query component to traverse a directory, subdirectories, sub-subdirectories, and so forth to retrieve a list of objects and metadata for the given criterion. Within the context of per-user aggregation, a per-user cache may be implemented to enable the user to traverse a single web address (e.g., a uniform resource locator ("URL")) to view and interact with data stored in one or more content group containers. To this end, a user-specific URL which serves as a link to a personalized user site may be provided. Content may be retrieved from a plurality of different sources and locally cached at the personalized user site in an aggregated list. For instance, within the personalized user site, metadata regarding one or more documents created within a community site may be stored on the personalized user site in an aggregated list comprising a plurality of content group containers. The documents may be retrieved from the one or more data sources and stored in a corresponding content group container.

In the embodiments described herein, personalized user site content may be updated utilizing an asynchronous update function which provides asynchronous updates for individual content groups within the personalized user site. The asynchronous update function enables the personalized user site to update changed data within a content group displayed in the site independently of unchanged data. Application programming interfaces (APIs) may be provided to the personalized user site which, when exposed, facilitate the building and updating of customized data by providing asynchronous update behavior for data viewable via the personalized user site.

Figure 1:
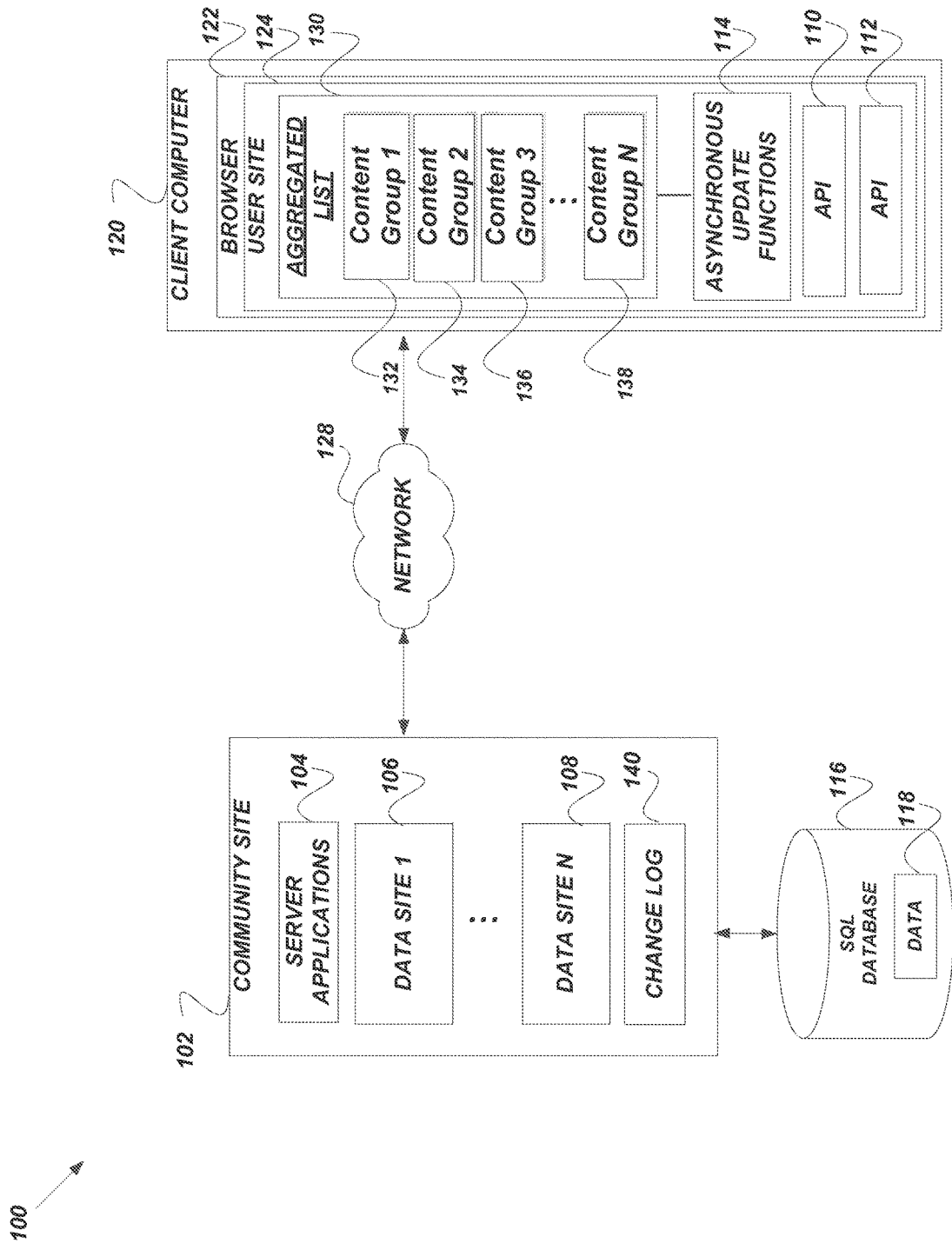
FIG. 1 illustrates the high level architecture of a system for providing per-user aggregation of content according to an embodiment of the disclosure.

Referring now to the drawings, in which like numerals represent like elements, various illustrative embodiments will now be described. FIG. 1 illustrates the high level architecture of a system 100 for providing per-user aggregation of content according to one embodiment. The system shown in FIG. 1 is for illustration purposes only. System 100 may be configured to create and manage personalized user sites and asynchronously update metadata of content stored on a personalized user site. The system 100 may operate in the context of an authenticated user that makes a request to a service that runs in the context of a particular site. In one embodiment, various components in the computer system 100 may be configured using SharePoint® services technology developed by Microsoft Corporation of Redmond, Wash. As is known to those skilled in the art, SharePoint® services technology enables users to create, maintain, and present a collaborative environment to share information. Using the technology, a user or organization can create personalized websites to provide and share information (e.g., documents from a web server or web folder, etc.) for other users associated with a respective website. For example, users can prepare documents which are distributed to members of a particular workgroup in a business organization or a class in an online academic institution. It should be understood that the embodiments described herein should not be construed as being limited to SharePoint® services technology and that other collaborative services technology from other developers and/or manufacturers may also be utilized. The computer system 100 and its components include functionality to communicate with other computing devices, communication devices, and/or other systems and are not intended to be limited to the embodiments and examples described herein.

As shown in FIG. 1, the computer system 100 includes, without limitation, a community site 102 (e.g., a web server) which is in communication with a database 116 (e.g., a structured language query ("SQL") database), and is also in communication with a client computer 120 over a network 128. In accordance with various embodiments, the community site 102 may include various program modules and application programs including, without limitation, server applications 104, data sites 106, 108, and the like. As described above, in one embodiment, the community site 102 may be configured to utilize SharePoint® services technology to create a collaborative environment for retrieving data from the SQL database 116 and delivering the retrieved data to the client computer 120. In particular, in accordance with one embodiment, the community site 102 may be configured as a SharePoint® platform and run the SharePoint® Server application program, as discussed above. It should be appreciated, however, that web server application programs from other manufacturers may also be utilized to embody the various aspects of the technical features discussed herein.

The server applications 104 may be configured deliver web pages (including content contained in the data sites 106, 108) to at least one component of the client computer 120 (e.g., the personalized user site 124). In an embodiment, the server applications 104 may comprise the SharePoint® Server application program discussed above. The data sites 106 may be configured to store data for one or more content groups which may include data retrieved from the SQL database 116. It should be understood that at least a portion of the data viewable on the personalized user site 124 may be static and thus may only be updated upon the reloading (or refreshing) of the site. To this end, the personalized user site 124 may include one or more asynchronous update functions 114, which will be described in further detail below. It should further be understood by those skilled in the art that a personalized user site 124 may comprise a data form web part class which provides the functionality for displaying a data view on the personalized user site 124. The personalized user site 124 may also include one or more APIs 110, 112, which, when exposed, facilitate the building and updating of customized data by providing asynchronous update behavior for data viewable via the personalized user site 124. The SQL database 116 may be in communication with the community site 102 and may store data 118. The SQL database 116 may be utilized by the data sites 1-N 106, 108 on the community site 102 to retrieve data 118 for display in data views on the personalized user site 124 (e.g., via a web page of the site). The client computer 120 may be in communication with the community site 102 and may be operable to execute a personalized user site 124 through a browser 122. The personalized user site 124 may also include an aggregated list module 130 configured to receive and store data items in individual content group containers 1-N 132-138. Requested data items may be accessed from the individual content group containers 1-N 132-138. In preferred embodiments, the aggregated list 130 may be a per-user data cache which is schema-equivalent to the data within individual sites (e.g., content group containers 1-N 132-138 and data sites 1-N 106-108).

In some embodiments, at least one component of the personalized user site 124 may be configured to insert modified data into the data view and update the displayed data view without reloading the entire site. In particular, the aggregated list 130 may be configured to utilize the asynchronous update functions 114 to display data in a data view on the personalized user site 124 which may be updated without having to reload or refresh the entire the personalized user site 124 and also which may be updated asynchronously or independently of other metadata which may be present on the same personalized user site 124. The asynchronous update functions 114 may comprise a function library including one or more refresh policies in the form of program code which may be utilized to update metadata for use in a personalized user site 124. In particular, those skilled in the art should appreciate that the asynchronous update functions 114 may be utilized to build on top of existing data form web part classes to retrieve and send updated data, which may allow the updating of data on the personalized user site 124 (which may include data filtering, sorting, and the viewing of additional data operations), without having to reload or refresh the entire personalized user site 124.

It should be appreciated that the aforementioned program modules and application programs may be utilized to create and manage a personalized user site 124, which enable the asynchronous updating of data content on the personalized user site 124 without having to update the entire site. As discussed above, the client computer 120 may be configured to receive personalized user site content from the community site 102 (e.g., via the server applications 104). In accordance with various embodiments, the browser 122 may provide a user interface which may be utilized by a user to open a personalized user site 124 to enable a user to select data (received, for example, from the SQL database 116) for display in the personalized user site 124. The personalized user site 124 may also be configured to request asynchronous updating of the data viewable in the personalized user site 124, without having to reload or refresh the entire site. In accordance with an embodiment, the personalized user site 124 may be a web-based shared services application program (e.g., SharePoint®) and the browser 122 may be any suitable browser application program (e.g., Internet Explorer®) capable of executing the personalized user site 124. It should be appreciated, however, that application programs from other manufacturers may also be utilized to embody the various aspects of the technical features discussed herein.

One example application of the system 100 may include an online university or other academic institution. To this end, the methods and systems disclosed herein may be utilized to access and manipulate education data in online academic collaboration sites such as courses and study groups. In the academic-collaboration site context, the community site 102 may be characterized as an education community and/or the data sites 106-108 may be characterized as education entities. In some embodiments, an education community represents an academic collaboration site for a course (e.g., a course offered at an online university). An education community may also be a study group, and/or a collection of education entities (e.g., an online university). An education entity may be an academic document, or a collection of academic documents (e.g., a collection of lessons, assignments, assignment categories, grades, submissions, events, documents, links, etc.). An academic document may further be defined as an education entity that represents any document stored in a shared services (e.g., SharePoint®) library for a course. Academic documents may be personal to a user or may be community entities (e.g., documents distributed to a plurality of users). For instance, an academic document may be a handout, lecture presentation, lecture notes, etc. Similarly, in the online academic collaboration environment context, a content type may include one or more content type sub-categories (e.g., an assignment due date, an assignment type, an assignment status, and a course name). While the example above describes the system 100 in an academic collaboration environment, other environments are contemplated, including, but not limited to social media, business environments, or any other suitable environment.

Figure 2:
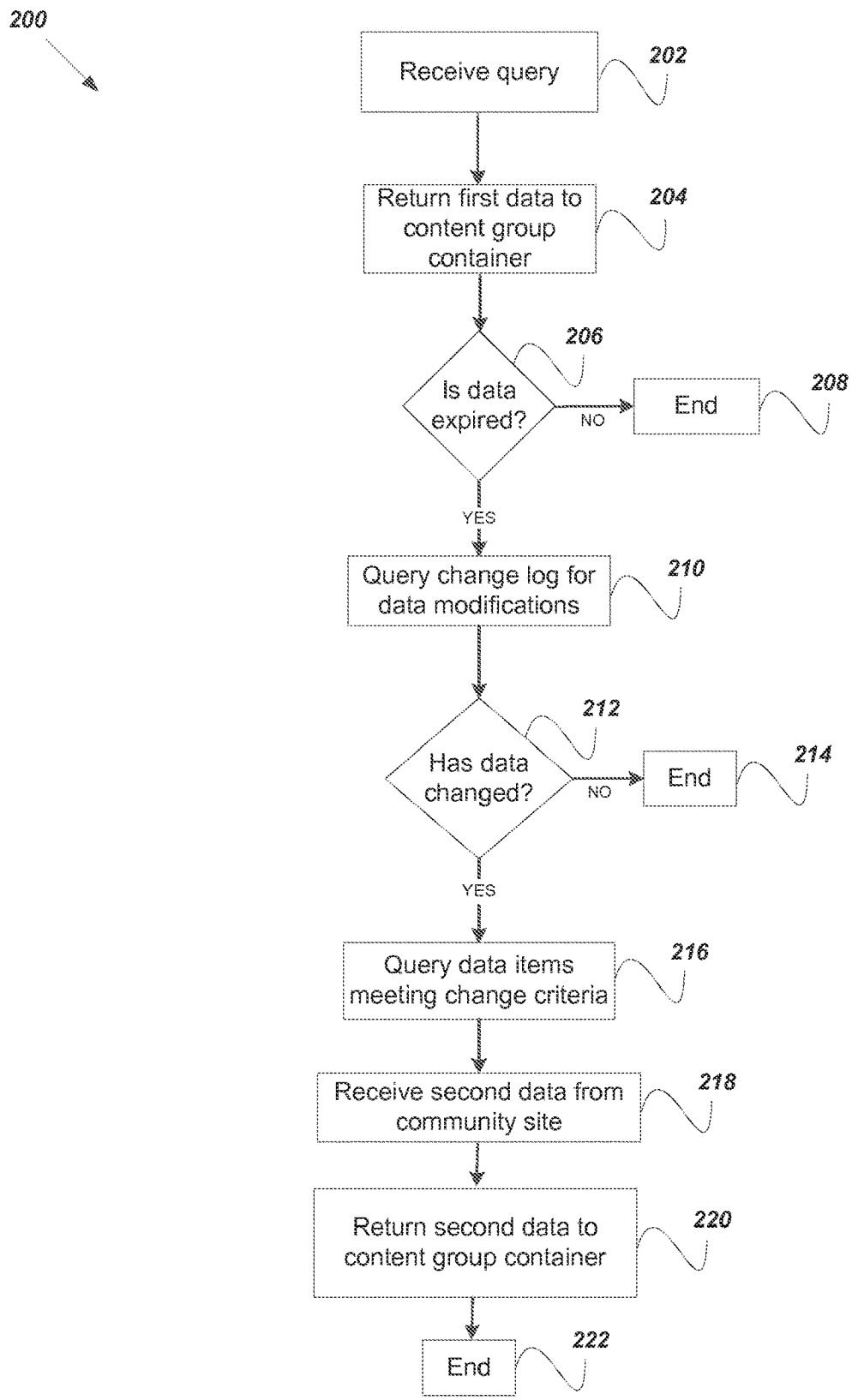
FIG. 2 is a flow diagram illustrating a routine for providing a per-user cache for asynchronously updating content on a personalized user site according to an embodiment of the disclosure.
Figure 3:
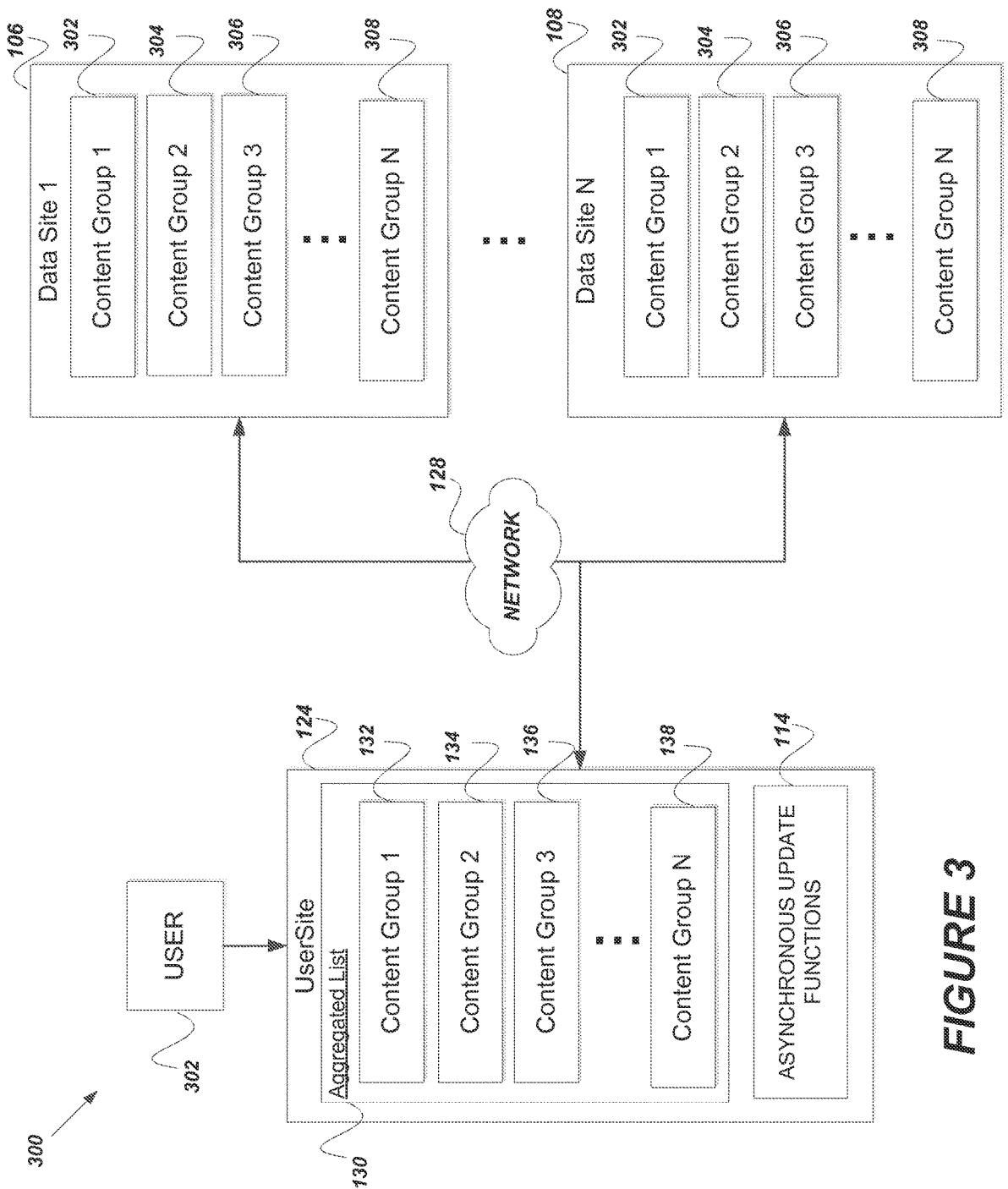
FIG. 3 illustrates an additional high level architecture of a system for providing per-user aggregation of content according to an embodiment of the disclosure.
Figure 4:
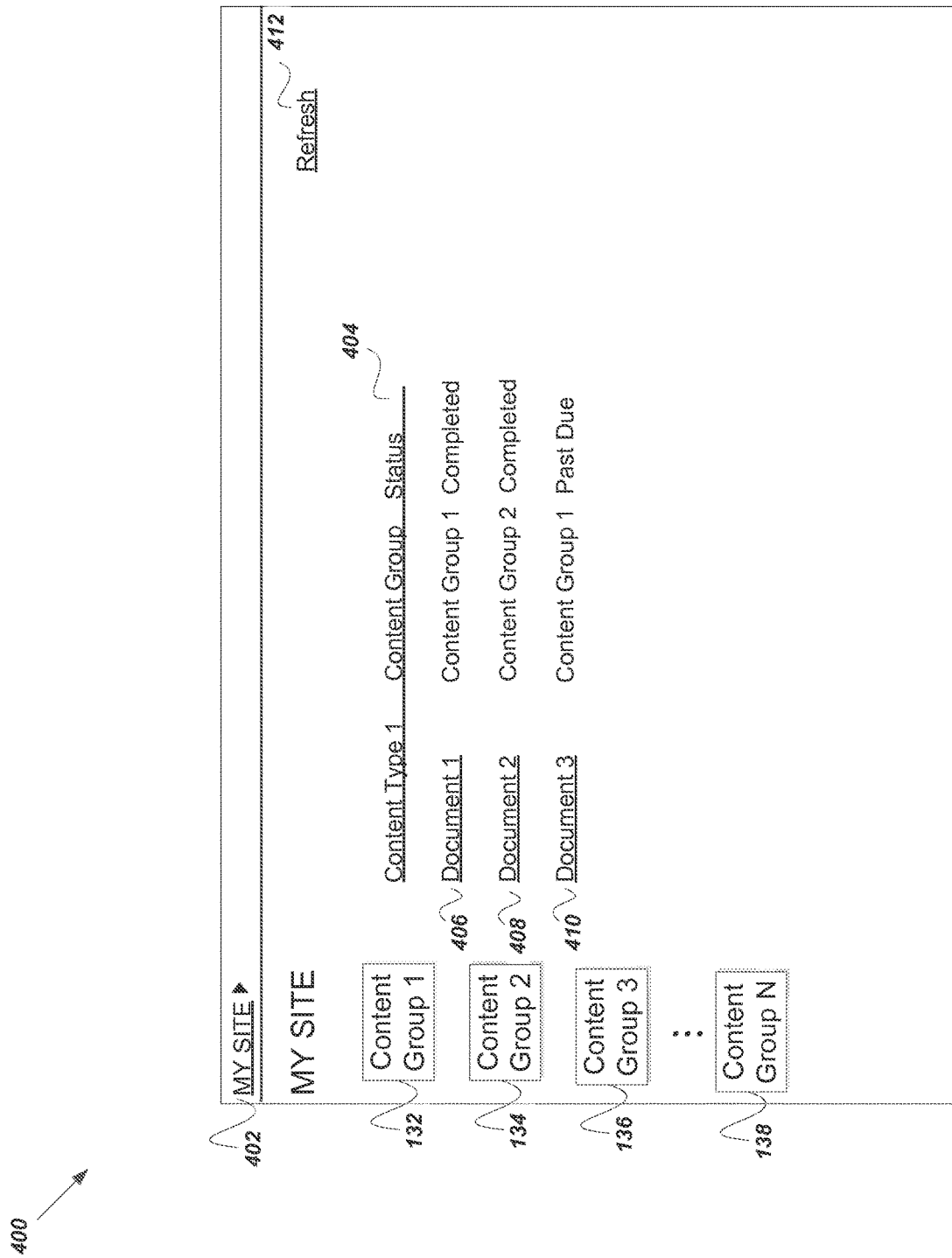
FIG. 4 illustrates a user interface of a personalized user site according to an embodiment of the disclosure.

Turning now to FIG. 2, a flow diagram illustrating a routine 200 for providing a per-user cache for asynchronously updating content on a personalized user site, in accordance with various embodiments, will now be described. In some embodiments, the routine 200 may be implemented via the system components and/or applications described above with respect to FIG. 1. Further examples of the systems and methods described herein are also provided in FIGS. 3 and 4. Additional or alternative embodiments using components other than those described in FIGS. 1 and 3-4 are also contemplated.

The routine 200 begins at operation 202, where, in response to user input, a data query is received. For instance, with reference to the components of FIG. 1, the data query may be received by an aggregated list 130 operating as a data cache for a personalized user site 124. Queried data may be metadata only. For instance, the data query may be a request for metadata regarding content stored in one or more content group containers 132-138 of the aggregated list 130. The client computer 120 may also be configured to provide an interface where a user can log in using a user identity provided by the community site 102. In one example, a data query may be initiated by a user accessing a URL addressable site. URL addressable site may be a personalized user site 124 locally storing and organizing user data. The personalized user site 124 may be configured to utilize one or more APIs 110, 112 (e.g., user profile service APIs) to determine the Uniform Resource Locator (URL) for the site to use as a starting point to request education entities. For instance, within the context of the academic collaboration environment described above, a user (e.g., a student) may be enrolled at an online academic institution, and may have been given a personalized URL corresponding to a personalized user site 124. For instance, a user access the personalized user site 124 by entering a URL address, such as http://mysite/personal/userid/default-.aspx, where "mysite" is the URL of the web application hosting one or more personalized user site 124, and "userid" is a users's personalized user id. The user may also be required to enter an authentication code such as a personal identification number (PIN) prior to accessing the personalized user site 124. Once a user has been authenticated, the user may then utilize the personalized user site 124 to access one or more documents.

According to embodiments of the present disclosure, and as described above, at least a portion of the data requested by a user of a personalized user site 124 may reside in a single location (e.g., aggregated list 130) that includes specific content group containers 132-138. To this end, data that may be imported into the personalized user site 124 may be distributed among the multiple containers 132-138. Individual and group data items may be included in each content group container 132-138. For instance, the personalized user site 124 may be configured to receive and store group and individual data items in respective containers 132-138 from an external source (e.g., any of Data Site 1-Data Site N 106, 108). An individual data item may generally be something personal to an end-user, such as a grade. A group data item is generally something meant to be shared among end-users, such as an assignment or a lesson. In preferred embodiments, each of the multiple data sites 106, 108 and the aggregated list 130 (including containers 132-138) may have the same schema, for ease of data transmission. Thus, the aggregated list 130 may be configured to preserve data integrity among multiple content sites (assuming, for example, that related content sites are normalized). Further, the aggregated list may include content metadata only. For instance, in an academic collaboration environment, an aggregated list 130 may include metadata content for each a student's classes. Metadata relating to one or more aspects of the classes (e.g., assignments, grades, lessons) may be accessible via the aggregated list. Data created by, for instance, a document creator (e.g., a professor, an administrator, etc.) may be imported into at least one component of an aggregated list 130 from the community site 102. To prevent overloads on the aggregated list 130, streamed data may be left in-situ.

The personalized user site 124 may be optimized to enable a client to specify the exact set of data and operations to perform in a single batch, making it suitable for situations where the connection speed between the client and the server can be slow. Localization-specific data properties, such as the title of a document, may be returned by using the preferred language of the user, if available, or by using the default language of the site as a fallback.

Within the context of the foregoing online academic collaboration environment, the student may be enrolled in one or more courses at the academic institution, and may receive a preconfigured site (e.g., personalized user site 124), and information regarding each course in which the student is enrolled may be accessed via the personalized user site 124. In such embodiments, the aggregated list 130 may be a cache that contains a list of all of the assignments for a particular course. Each course may be characterized as a content group, and course information may reside in a respective content group container 132-138. In other embodiments, each container 132-138 may be representative of specific content groups within a course (e.g., a lesson, an assignment, a grade, etc.). In the above described example of an online academic collaboration environment, a received query may be a request to view the next 5 upcoming assignments. The request may include a sub-request to sort the results by the due date. Thus, a query to the aggregated list 130 may include information such as "retrieve top 5 assignments where: userid=x, OrderBy DueDate Asc," or the like. In such embodiments the aggregated list 130 may query the content group containers 132-138 for the requested information.

In some embodiments, the system 100 may enable a client application to query by change time, query by directory, query by transaction (create, delete, purge), query by namespace, and page through results, etc. The aggregated list 130 may distribute the query to all regions across all the sites (e.g., content group containers 132-138) in a content platform system, and the aggregated list 130 may sort the results before returning the list back to the client application. According to specific embodiments, the database query is implemented in the aggregated list 130.

In response to receiving the data query 202, the aggregated list 130 may search one or more content group containers 132-138 for the requested data. From operation 202, the routine 200 continues to operation 204, where, in response to the received query, an aggregated list 130 retrieves and returns at least a portion of the requested data to the personalized user site 124. For instance, first metadata relating to the requested query from at least one component of the aggregated list 130. In such embodiments, the aggregated list 130 may retrieve at least a portion of the requested data from one or more content group containers 132-138, if available. The content group containers 132-138 of the aggregated list 130 may include metadata cached from a plurality of sources (e.g., one or more data sites 106, 108). Returned data from aggregated list 130 may be returned prior to verifying whether or not the data is expired. Returning at least a portion of the requested data may provide a seamless end-user experience, minimizing delays in data presentation by the personalized user site 124. In some embodiments, system 100 may utilize JavaScript Object Notation (JSON) to format data returned to a requesting client. The metadata displayed for each data query may include information such as title, type, due date, status, site, etc. For instance, if the query is for a list of upcoming assignments, returned data may include the list of assignments, and information provided for each assignment may include an assignment name, an assignment due date, and the like.

From operation 204, the routine 200 continues to operation 206, where, in response to the query, the aggregated list 130 verifies whether the returned data is expired. This operation may happen generally concurrently with returning at least a portion of the requested data of operation 204. It is contemplated that data included in the aggregated list 130 may also be modified. For instance, an assignment list may be updated to include new assignments, a grades site may be updated as new grades are assigned, etc.). However, to minimize data transmissions, and thereby increase data retrieval efficiency, the aggregated list 130 may not be constantly updated. Also, a personalized user site 124 may not constantly receive and display updated metadata content from the aggregated list 130. Rather, in the embodiments described herein, personalized user site content may be updated utilizing one or more asynchronous update functions 114, which provide asynchronous updates for personalized user site data. Thus, in preferred embodiments of the disclosure, a personalized user site 124 may be configured to query the aggregated list 130 and the aggregated list may be configured to query a content site (e.g., community site 102) for changed data that is specific to a user of the personalized user site 124 as the data is requested by the personalized user site 124.

As described above, the aggregated list may be a per-user persisted cache. Thus, the aggregated list 130 may be configured to transparently store data so that future requests for that data can be served faster. Data that is stored within the aggregated list 130 might be data that has been computed earlier or duplicates of original data stored elsewhere. If requested data is contained in the aggregated list 130 (e.g., a cache hit), a data request may be served by simply reading the aggregated list, which is comparatively faster. Otherwise, if the data is not stored in the aggregated list 130, (e.g., a cache miss), the data may have to be recomputed or fetched from its original storage location (e.g., one of data sites 106, 108, which is comparatively slower. Hence, the greater the number of requests that can be served from the aggregated list 130, the faster the overall system performance becomes.

To provide a per-user persisted cache, the cache refresh of the aggregated list 130 may be asynchronous (e.g., triggered by the user only when data is requested). To this end, a pull model may be implemented, where a refresh thread seeks out a changed entity (e.g., the system may provide an efficient "dirty bit" query), for only an entity (e.g., content group) that has changed. The thread may then fetch the changed metadata and refresh the cache. The thread may also mark a last refresh time (e.g., to determine staleness/expiration) at a later time. In the embodiments described herein, system reads may exceed system writes (e.g., changes) by at least two or three orders of magnitude. Thus, a cache refresh may only occasionally be required, and any updates may be minimal. For instance, if a request comes for data that is being asynchronously updated, the data can simply be passed down to the underlying device. If the asynchronous update is outstanding, there must have been a very recent request for the same data that initiated the update, and the data is likely to be cached at the aggregated list 130.

To provide asynchronous updating of data, the aggregated list 130 may utilize an on-demand update algorithm for determining operations to be executed upon receiving a data request. For instance, the on-demand algorithm may be triggered upon receiving the request for metadata. Using the on-demand update algorithm, the aggregated list 130 may compare cached data residing in the list to a staleness interval to determine if cached data is expired (e.g., stale). The cache refresh of the aggregated list 130 may also be controlled by a previously established confirmable staleness interval, which may be accomplished on a per-entity (e.g., content group) basis. For instance, customizable staleness settings per data type may be included and may be determined by the aggregated list 130. In such embodiments, data residing in one or more content group containers 132-138 may include a timestamp. The algorithm may also include relationship aware update semantics for appropriately updating the queried metadata. As such, semantic differences among content groups regarding rate of change may be modeled. For example, in the online academic collaboration environment described above, the aggregated list 130 may recognize that certain data (e.g., grades) gets updated more often than other data (e.g., assignments), or that lesson materials change less often than the number of assignment submissions. Thus, each data type may be configured to include a customized staleness interval having a preconfigured relationship to the frequency of updates. In such embodiments, upon establishing a staleness interval, the timestamp of the requested cached data may be compared to the staleness interval set for the data to verify whether the data is expired.

If the data is not expired, the routine may end at operation 208.

Otherwise, from operation 206, the routine 200 continues to operation 210, where, upon determining that the returned data is expired, a change log 140 is queried for data modifications. In preferred embodiments, the aggregated list 130 queries the change log 140 for any changes in the requested data. The change log 140 may reside on the community site 102, and may be configured to communicate with the data sites 1-N 106, 108 and the aggregated list 130. The data sites 1-N 106, 108 may report changes in data items to the change log 140. Reporting may occur periodically, at scheduled intervals, or dynamically. The change log 140 may store changed data information and may transmit the change log information upon request. The aggregated list 130 may receive the change log information regarding requested metadata immediately following the request.

From operation 210, the routine 200 continues to operation 212, where, the aggregated list 130 receives a response from the change log 140 verifying whether the requested data has changed. If the data is not changed, the routine may end at operation 214. Otherwise, upon determining that the requested data has changed, at operation 216, the aggregated list 130 may query a community site 102 for data meeting the change criteria. To retrieve requested data that has expired, the aggregated list 130 may be configured to access the community site 102, and the community site 102 may be configured to accept requests from the Internet. If the requested data has changed, aggregated list 130 may retrieve the changed requested data from an original location, or from a database data site storing a current version of the requested data. Thus, to accomplish per-user caching of metadata, the aggregated list 130 may be in communication with a community site 102 storing applicable user content. In the context of a shared services repository (e.g., SharePoint®), content may be divided into sites, and each site may include one or more lists or libraries.

From operation 216, the routine 200 continues to operation 218, where, the aggregated list receives the requested changed data from the community site. FIG. 3 further illustrates an embodiment 300 detailing the content group containers 1-N 132-138 and their correlation to the data sites 1-N 106, 108, which may also include corresponding server-side content group containers 1-N 302-308.

From operation 218, the routine 200 continues to operation 220, where, upon receiving the changed data, the aggregated list returns the changed data to the personalized user site. For instance, in response to the received changed metadata, the aggregated list 130 may insert the modified data into a respective content group container 132-138 to enable the personalized user site 124 to display the metadata in a data view. A personalized user site 124 may include one or more display areas on a web page for viewing data which may be independent of other data also displayed on the web page (the other data may also be displayed in one or more additional data views). FIG. 4 is an example of an end user experience of a personalized user site. As can be seen in FIG. 4, the personalized user site 124 of FIG. 1 may be referred to as "MySite," 402 and may include one or more content group containers 132-138 storing data for one or more content types. A personalized user site display sub-area 404 may provide selectable access to one or more documents 406-410 within a content group 132-138 specific to a user. A refresh option 412 may also be provided in a display area of the personalized user site 124 to enable a user to refresh the personalized user site 124 if desired.

From operation 220, the routine 200 may then terminate at operation 222.

It should be understood that the asynchronous update functions 114 further enable the personalized user site 124 to update data displayed in the site independently of data displayed for other content groups which may be viewable on the personalized user site 124. At least one component of the personalized user site 124 (e.g., the aggregated list 130) may be configured to utilize the asynchronous update functions 114 to provide data displayable in a data view on the personalized user site 124, which may be updated without having to reload or refresh all data personal to a user and accessible from the personalized user site 124. It should also be understood, in accordance with various embodiments, that in addition to updating data without the reloading the entire personalized user site 134, data residing in one or more of content group containers 132-138 may also be configured to be updated asynchronously or independently of each other. For instance, in the academic collaboration context, a grade container may be updated more or less frequently than an assignment container. Or a container representing one course may update independently of other courses, as requested by the specific user. In another embodiment, application programming APIs 110, 112 may be provided in the personalized user site 124 which, when exposed, facilitate the building and updating of customized data by providing asynchronous update behavior for data in an individual content group viewable via the personalized user site 124. For instance, the aggregated list 130 may be configured to expose one or more APIs to provide personalized user site 124 developers access to the update functionality provided by the asynchronous update functions 114. Thus, it will be appreciated that a personalized user site 124 developer may "call" the exposed APIs 110, 112 to provide access to the asynchronous update functions 114.

It should further be understood that the aggregated list, in updating content group specific metadata without reloading the personalized user site 124, may be configured to perform a number of additional functions with respect to viewable metadata in a data view. Another function which may be included in the aggregated list 130 may be a frequency setting for automatically updating a data view. For example, a user may set personalized user site 124 to automatically update a data view every five seconds, and an aggregated list 130 may initiate the operations described above to comply with the refresh interval.

The cache refresh approach described herein can be useful in a system that has a heavy load with respect to data access. Use of a persisted cache may also reduce the impact of client restarts on the server by only fetching data modifications on restart. The persisted cache may also reduce unnecessary calls to the server and improve the performance of gets by caching on the client. Additionally, the persisted cache may allow for larger caches than in-memory caches.

Figure 5:
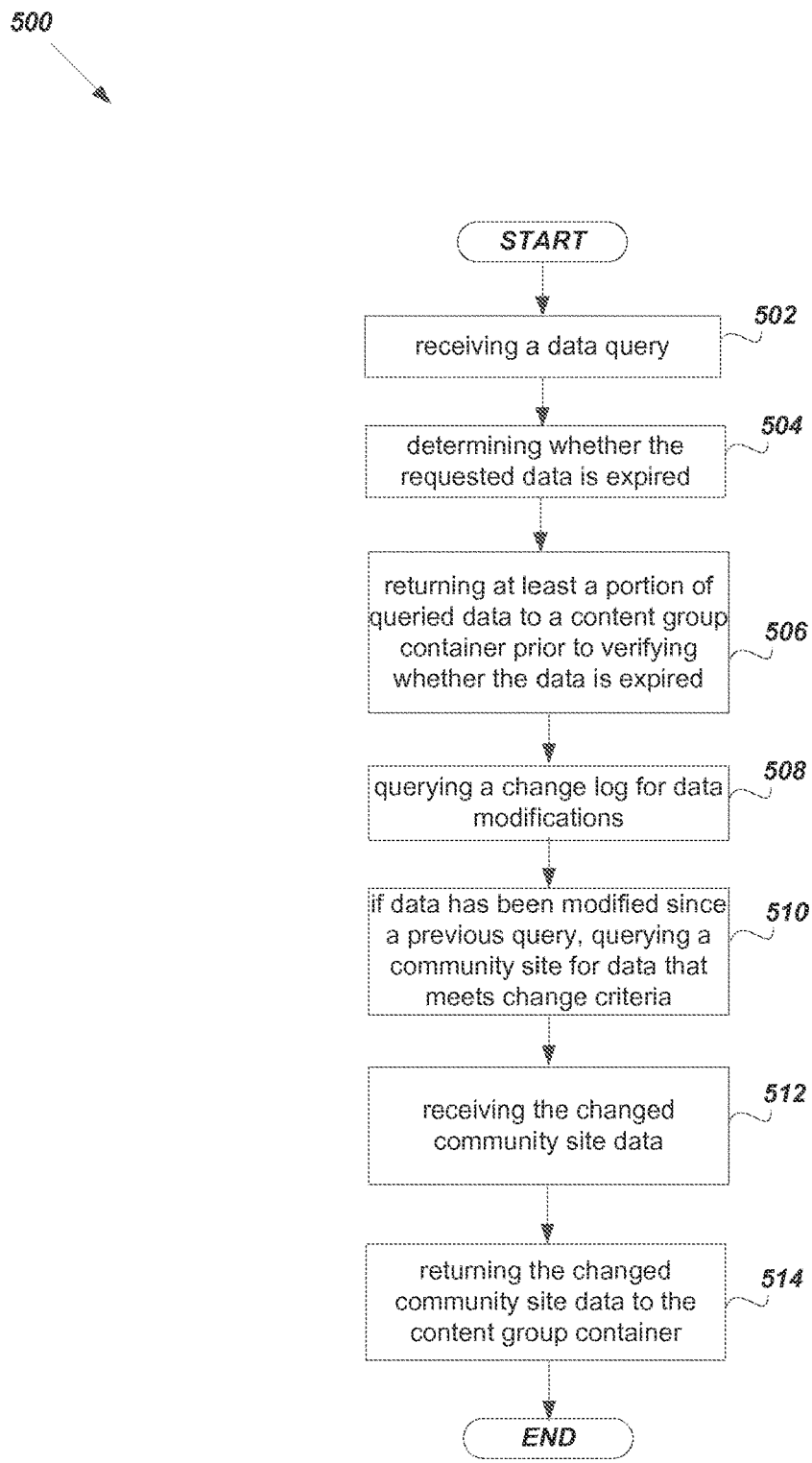
FIG. 5 is flow diagram illustrating a method for providing per-user aggregation of content accessible via a personalized user site according to an embodiment of the disclosure.

FIG. 5 is a flowchart of a method 500 for providing per-user aggregation of content according to an embodiment of the disclosure. In some embodiments, the method 500 may be implemented via the system components and/or applications described above with respect to FIGS. 1-4. The method 500 may generally include receiving 502 a data query. Data query may be a request for metadata. The method 500 may also include determining 504 whether the requested data content is expired. The method 500 may further include returning 506 at least a portion of queried data prior to verifying whether list data is expired. The method 500 may then include querying 508 a change log for data modifications. For instance, the server may query a change log for modifications. In some instances, querying the change log includes determining whether data included in the aggregated list has changed since a previous query. The method 500 may further include, if list data has been modified since a previous query, querying 510 a query a community site for data that meets change criteria. For example, change criteria may be that data has a last modified time greater than the last aggregated list refresh time and update aggregated list. The method 500 may then include receiving 512 the changed community site data and returning 514 the changed community site data to a specified container within the personalized user site.

Embodiments above the above described system and method may be implemented as a computer process, a computing system or as an article of manufacture such as a computer program product or computer readable media (including a computer storage device). The computer program product may be a computer storage media or device readable by a computer system and encoding a computer program of instructions for executing a computer process.

The example systems and methods in FIGS. 1-5 have been described with specific client devices, applications, modules, and interactions that may execute in conjunction with an application program that runs on an operating system on a personal computer. Embodiments are not limited to systems according to these example configurations. Furthermore, specific protocols and/or interfaces may be implemented in a similar manner using the principles described herein.

Figure 6:
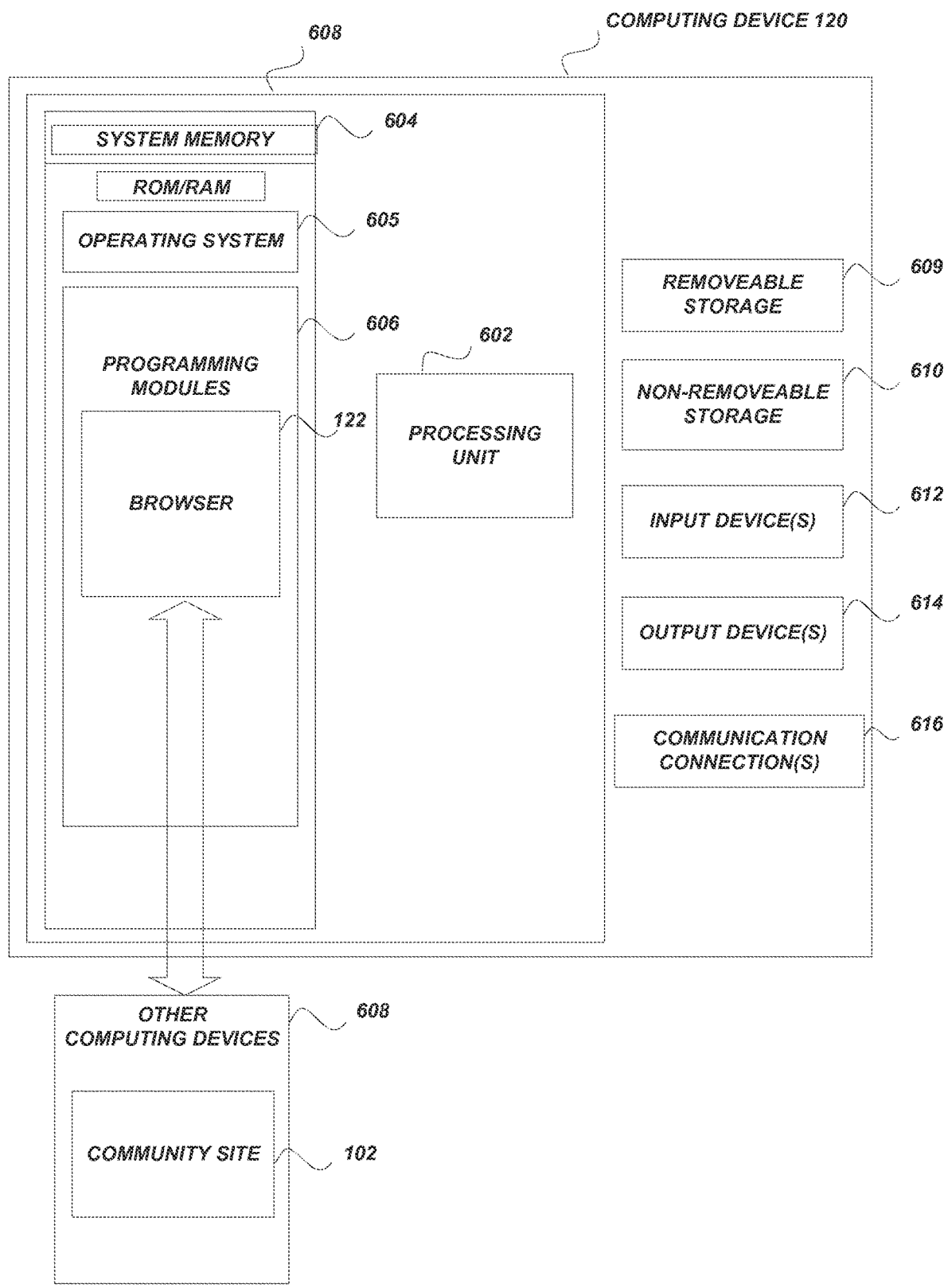
FIG. 6 is a simplified block diagram of a computing system in which embodiments of the present invention may be practiced.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIG. 6 and its associated description provide a discussion of a variety of operating environments in which embodiments may be practiced. However, the devices and systems illustrated and discussed with respect to FIG. 6 are for purposes of example and illustration and are not limiting of a vast number of computing device configurations that may be utilized for practicing embodiments, described herein.

FIG. 6 is a block diagram illustrating example physical components of a computing device 600 with which embodiments may be practiced. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination. System memory 604 may include operating system 605 and one or more programming modules 606. Operating system 605, for example, may be suitable for controlling the operation of computing device 600. Furthermore, embodiments may be practiced in conjunction with a graphics library, other operating systems, or any other application program and is not limited to any particular application or system. This basic configuration is illustrated in FIG. 6 by those components within a dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610.

As stated above, a number of program modules and data files may be stored in system memory 604, including operating system 605. While executing on processing unit 602, programming modules 606 may perform processes including, for example, one or more of the processes described above with reference to FIGS. 1-5. The aforementioned processes are an example, and processing unit 602 may perform other processes. Other programming modules that may be used in accordance with embodiments may include browsers, database applications, etc.

Generally, consistent with embodiments, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Furthermore, embodiments may be practiced in an electrical circuit comprising discrete electronic elements, packaged or integrated electronic chips containing logic gates, a circuit utilizing a microprocessor, or on a single chip containing electronic elements or microprocessors. For example, embodiments may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may be operated via application-specific logic integrated with other components of the computing device/system 600 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

Embodiments, for example, may be implemented as a computer process (method), a computing system, or as an article of manufacture, such as a computer program product or computer-readable storage medium or computer storage device. The computer program product may be a computer-readable storage medium or device readable by a computer system and encoding a computer program of instructions for executing a computer process. The term computer-readable storage medium as used herein may include computer storage media. Computer storage media may include volatile and nonvolatile, removable and non-removable media implemented in any method or technology for storage of information, such as computer-readable instructions, data structures, program modules, or other data. System memory 604, removable storage 609, and non-removable storage 610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a touch input device, etc. Output device(s) such as a display, speakers, a printer, etc. may also be included. The aforementioned devices are examples and others may be used.

Communication media may be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Embodiments herein may be used in connection with mobile computing devices alone or in combination with any number of computer systems, such as in desktop environments, laptop or notebook computer systems, multiprocessor systems, micro-processor based or programmable consumer electronics, network PCs, mini computers, main frame computers and the like. Embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-5. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data can also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

It will be apparent to those skilled in the art that various modifications or variations may be made to embodiments without departing from the scope or spirit. Other embodiments are apparent to those skilled in the art from consideration of the specification and practice of the embodiments disclosed herein.

What is claimed:

1. A system comprising:
   at least one processor; and
   memory encoding computer executable instructions that, when executed by the at least one processor, cause the at least one processor to perform a method for providing per-user aggregation of content accessible via a personalized user site, the method comprising:
   receiving, at the personalized user site, a request for data from a user device;
   returning at least a portion of queried data to the user device from a content group container within the personalized user site prior to verifying whether the data is expired;
   querying for data modifications;
   based on a determination that the data has been modified since a previous request for the data, sending a query to a community site for data that meets change criteria;
   receiving the data that meets the change criteria from the community site; and
   returning the data that meets the change criteria to a content group container within the personalized user site and to the user device.

2. The system of claim 1, wherein querying for data modifications includes querying a change log.

3. The system of claim 1, further comprising:
   triggering at least one asynchronous update function upon receiving the request for data.

4. The system of claim 3, wherein triggering at least one asynchronous update function includes triggering an on-demand update algorithm for determining operations to be executed upon receiving the request for data.

5. The system of claim 4, wherein triggering an on-demand update algorithm includes:
   determining a previously established customized staleness setting for the content group container;
   determining a timestamp for the requested data residing in the content group container; and
   comparing the timestamp of the data residing in the content group container to the customized staleness setting.

6. The system of claim 1, wherein sending a query to a community site for data that meets change criteria includes sending a query to one or more data sites within the community site or to an external database.

7. The system of claim 1, wherein receiving the data that meets the change criteria includes receiving the changed data from at least one data site within the community site.

8. The system of claim 1, further comprising:
   inserting the data that meets the change criteria into a data view of the personalized user site without reloading the entire site.

9. A method for providing per-user aggregation of content accessible via a personalized user site comprising:
   receiving, at a personalized user site, a request for metadata;
   returning at least a portion of queried metadata to the user device from a content group container within the personalized user site prior to verifying whether the metadata is expired;
   querying for metadata modifications;
   based on a determination that the metadata has been modified since a previous request for the metadata, sending a query to a community site for metadata that meets change criteria;
   receiving the metadata that meets the change criteria from the community site; and
   returning the metadata that meets the change criteria to a content group container within the personalized user site and to the user device.

10. The method of claim 9, wherein querying for metadata modifications includes querying a change log.

11. The method of claim 9, further including triggering at least one asynchronous update function upon receiving the request for metadata.

12. The method of claim 11, wherein triggering at least one asynchronous update function includes triggering an on-demand update algorithm for determining operations to be executed upon receiving the request for metadata.

13. The method of claim 12, wherein triggering an on-demand update algorithm includes:
    determining a previously established customized staleness setting for the content group container;
    determining a timestamp for the requested metadata residing in the content group container; and
    comparing the timestamp of the metadata residing in the content group container to the customized staleness setting.

14. The method of claim 13, further comprising determining whether the requested metadata is expired by applying relationship aware update semantics to the content group container based on a content type to establish the customized staleness setting.

15. The method of claim 9, wherein sending a query to a community site for metadata that meets change criteria includes sending a query to one or more metadata sites within the community site or to an external database.

16. A system comprising:
    at least one processor; and
    memory encoding computer executable instructions that, when executed by the at least one processor, cause the at least one processor to perform a method for providing for asynchronously updating content on a personalized user site, the method comprising:
    receiving, at the personalized user site, a request for metadata from a user device for content stored in one or more content group containers;
    returning at least a portion of queried metadata to the user device from a content group container within the personalized user site prior to verifying whether the metadata is expired;
    when it is determined that the requested metadata is expired, querying a change log for metadata modifications;
    based on a determination that the metadata has been modified since a previous request for the metadata, sending a query to a community site for metadata that meets change criteria;
    receiving the metadata that meets the change criteria from the community site; and
    returning the metadata that meets the change criteria to the one or more content group containers and to the user device.

17. The system of claim 1, wherein the personalize user site is accessible via a Uniform Resource Locator (URL) specific to a user.

18. The system of claim 1, wherein the request for data comprises a request for metadata regarding content stored in one or more content group containers of the personalized user site, the one or more content group containers including the content group container for which changed data is received.

19. The system of claim 1, further comprising determining, at a server application, whether the requested data is expired.

20. The method of claim 9, further comprising determining, at a server application, whether the requested data is expired.

* * * * *